(12) United States Patent
Cai et al.

(10) Patent No.: US 11,293,677 B2
(45) Date of Patent: Apr. 5, 2022

(54) CHILLER SYSTEM, METHOD FOR OBTAINING MIDDLE WATER TEMPERATURE AND CONTROL METHOD THEREOF

(71) Applicant: Carrier Corporation, Jupiter, FL (US)

(72) Inventors: Xing Cai, Shanghai (CN); Zhongjian Li, Shanghai (CN); Yuanming Yuan, Shanghai (CN); Zongtao Lu, Farmington, CT (US); Junqiang Fan, Glastonbury, CT (US); Shufu Ding, Shanghai (CN); Hong Zhang, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 219 days.

(21) Appl. No.: 16/095,254

(22) PCT Filed: Apr. 12, 2017

(86) PCT No.: PCT/US2017/027188
§ 371 (c)(1),
(2) Date: Oct. 19, 2018

(87) PCT Pub. No.: WO2017/184403
PCT Pub. Date: Oct. 26, 2017

(65) Prior Publication Data
US 2019/0137155 A1    May 9, 2019

(30) Foreign Application Priority Data
Apr. 21, 2016   (CN) .......................... 201610249605.3

(51) Int. Cl.
*F25B 1/053*   (2006.01)
*F25B 49/02*   (2006.01)
(Continued)

(52) U.S. Cl.
CPC .............. *F25B 49/02* (2013.01); *F25B 1/053* (2013.01); *F25B 25/005* (2013.01); *F25D 29/00* (2013.01);
(Continued)

(58) Field of Classification Search
CPC .................... F25B 25/005; F25B 1/053; F25B 2400/21161; F25B 2600/026
See application file for complete search history.

(56) References Cited

U.S. PATENT DOCUMENTS

| | | | |
|---|---|---|---|
| 877,497 | A | 1/1908 | Gamble |
| 4,483,152 | A | 11/1984 | Bitondo |

(Continued)

FOREIGN PATENT DOCUMENTS

| | | |
|---|---|---|
| CN | 103968478 A | 8/2014 |
| EP | 2597400 A2 | 5/2013 |

(Continued)

OTHER PUBLICATIONS

Chinese Office Action for Application No. 201610249605.3; dated Jun. 11, 2020; 10 Pages.

(Continued)

*Primary Examiner* — Elizabeth J Martin
*Assistant Examiner* — Nael N Babaa
(74) *Attorney, Agent, or Firm* — Cantor Colburn LLP (57) ABSTRACT

A cooler system includes a plurality of cooler units; a condensed water flow path, an aqueous medium in the condensed water flow path sequentially flowing through each of the cooler units; a cooling water flow path, an aqueous medium in the cooling water flow path sequentially flowing through each of the cooler units in a flow direction opposite to a flow direction of the aqueous medium in the condensed water flow path; a plurality of current sensors used for detecting working currents of the cooler units;

(Continued)

water temperature sensors used for detecting an entering water temperature and a leaving water temperature of the cooling water flow path; at least one virtual temperature sensor arranged between the cooler units and used for acquiring a middle water temperature between the cooler units; and a controller.

7 Claims, 8 Drawing Sheets

(51) Int. Cl.
    *F25B 25/00*     (2006.01)
    *F25D 29/00*     (2006.01)

(52) U.S. Cl.
    CPC ..... *F25B 2339/047* (2013.01); *F25B 2400/06* (2013.01); *F25B 2600/026* (2013.01); *F25B 2600/0253* (2013.01); *F25B 2700/21161* (2013.01); *F25B 2700/21171* (2013.01); *Y02B 30/70* (2013.01)

(56) References Cited

U.S. PATENT DOCUMENTS

| | | | |
|---|---|---|---|
| 5,600,960 | A | 2/1997 | Schwedler et al. |
| 8,250,879 | B2 | 8/2012 | Macbain et al. |
| 8,774,978 | B2 | 7/2014 | Higgins et al. |
| 8,977,373 | B2 | 3/2015 | Felty et al. |
| 9,141,915 | B2 | 9/2015 | Alonso et al. |
| 2005/0204760 | A1* | 9/2005 | Kurita ................... F25B 49/025 62/228.1 |
| 2008/0028778 | A1* | 2/2008 | Millet ................... G06F 1/206 62/129 |
| 2010/0115984 | A1 | 5/2010 | Macbain et al. |
| 2011/0283718 | A1 | 11/2011 | Ueda |
| 2012/0103009 | A1 | 5/2012 | Ding et al. |
| 2012/0116827 | A1 | 5/2012 | Susumago |
| 2013/0125573 | A1 | 5/2013 | Nikaido et al. |
| 2014/0069120 | A1 | 3/2014 | Takemoto et al. |
| 2015/0134123 | A1 | 5/2015 | Obinelo |
| 2015/0204594 | A1* | 7/2015 | Luo ................... F25B 13/00 62/115 |
| 2015/0241100 | A1 | 8/2015 | Matsuo et al. |
| 2015/0338281 | A1 | 11/2015 | Ross et al. |
| 2015/0354849 | A1 | 12/2015 | Matsuo et al. |
| 2015/0362240 | A1* | 12/2015 | Sibik ................... F04D 27/0246 62/115 |

FOREIGN PATENT DOCUMENTS

| | | |
|---|---|---|
| EP | 2902724 A1 | 8/2015 |
| JP | H0593550 A | 4/1993 |
| JP | 2014202410 A | 10/2014 |
| WO | 2008045039 A1 | 4/2008 |
| WO | 2015035241 A1 | 3/2015 |

OTHER PUBLICATIONS

Hanson, Susanna et al., "Applications Engineering Manual", TRANE, 2011, 113 pages.
International Search Report and Written Opinion for application PCT/US2017/027188, dated Jul. 11, 2017, 13 pages.
Kotiaho, Voitto, et al., "Effect of Robotics and Mechnical Engineering Research", Journal of Robotics and Mechanical Engineering Research, vol. 1, Issue 1, 2015, 7 pages.

* cited by examiner

CHILLER SYSTEM, METHOD FOR OBTAINING MIDDLE WATER TEMPERATURE AND CONTROL METHOD THEREOF

TECHNICAL FIELD

The present invention relates to the field of refrigeration, in particular to a cooler system, and a middle water temperature acquisition method and a control method for the same.

BACKGROUND ART

At present, at many commercial places such as hospitals and shopping malls, a method of connecting a plurality of cooler units in series is usually adopted to satisfy demands for higher refrigeration capacities. Under this situation that a plurality of cooler units are connected in series, in order to control each cooler unit to operate stably and balance respective operating load thereof, a middle water temperature between the plurality of cooler units usually needs to be monitored, and the middle water temperature is enabled to satisfy a set value thereof by continuously adjusting the operating load of the unit, thus each unit can operate according to an expected load respectively.

In this type of cooler system, monitoring the middle water temperature between the cooler units becomes an indispensable link. The most common method for monitoring the middle water temperature is to arrange water temperature sensors. On one hand, material costs are increased; and on the other hand, which is also the most difficult aspect, no enough space for water temperature sensor arrangement is usually reserved in the layout of this type of cooler system. If water temperature sensors are arranged, the modification to the overall layout of the cooler system is very possibly further caused or a higher space requirement is made on layout spaces. Consequently, a series of changes caused thereby will be very complex and the cost will be very high.

SUMMARY OF THE INVENTION

The purpose of the present invention is to provide a cooler system in which a middle water temperature can be acquired and the operation of units can be controlled based on the middle water temperature.

The purpose of the present invention is further to provide a middle water temperature acquisition method for a cooler system.

The purpose of the present invention is further to provide a control method for a cooler system.

According to one aspect of the present invention, there is provided a cooler system, comprising: a plurality of cooler units; a condensed water flow path, an aqueous medium in the condensed water flow path sequentially flowing through each of the cooler units; a cooling water flow path, an aqueous medium in the cooling water flow path sequentially flowing through each of the cooler units in a flow direction opposite to a flow direction of the aqueous medium in the condensed water flow path; and a plurality of current sensors used for detecting working currents of the cooler units; water temperature sensors used for detecting an entering water temperature Tenter and a leaving water temperature Tleave of the cooling water flow path; at least one virtual temperature sensor arranged between the cooler units and used for acquiring a middle water temperature on the cooling water flow path between the cooler units; and a controller used for setting a middle water temperature set value and/or a leaving water temperature set value and capable of adjusting a refrigeration capacity of the cooler units to enable the middle water temperature to be close or equal to the middle water temperature set value and/or to enable the leaving water temperature to be close or equal to the leaving water temperature set value.

According to another aspect of the present invention, there is further provided a middle water temperature acquisition method for a cooler system, comprising the following steps: S110, acquiring an entering water temperature Tenter and a leaving water temperature Tleave of a cooling water flow path of the cooler system; S120, acquiring working currents I1, I2 . . . In of cooler units in the cooler system; S130, acquiring rated refrigeration capacities C1, C2 . . . Cn of the cooler units in the cooler system; and S140, acquiring middle water temperatures Tmid1, Tmid2 . . . Tmid(n-1) based on a ratio relation among a ratio of temperature differences between an entering water temperature and a leaving water temperature of each of the cooler units, a ratio of rated refrigeration capacities of the cooler units, a ratio of working currents of the cooler units and a correction factor, where n is the number of cooler units and n is greater than or equal to 2.

According to another aspect of the present invention, there is further provided a control method for a cooler system, comprising the following steps: S210, acquiring an entering water temperature Tenter and a leaving water temperature Tleave of a cooling water flow path of the cooler system; acquiring working currents I1, I2 . . . In of the cooler units in the cooler system; acquiring rated refrigeration capacities C1, C2 . . . Cn of the cooler units in the cooler system; and acquiring middle water temperatures Tmid1, Tmid2 . . . Tmid(n-1) based on a ratio relation among a ratio of temperature differences between an entering water temperature and a leaving water temperature of each of the cooler units, a ratio of rated refrigeration capacities of the cooler units, a ratio of working currents of the cooler units and a correction factor; S220, acquiring middle water temperature set values Tmid1_set, Tmid2_set . . . Tmid(n-1)_set between all cooler units and a leaving water temperature set value Tleave_set; and S230, adjusting a refrigeration capacity of each upstream cooler unit to enable the middle water temperatures Tmid1, Tmid2 . . . Tmid(n-1) between all cooler units to be close or equal to the middle water temperature set values Tmid1_set, Tmid2_set . . . Tmid(n-1)_set; and/or adjusting a refrigeration capacity of a downstream cooler unit to enable the leaving water temperature Tleave to be close or equal to the leaving water temperature set value Tleave_set, where n is the number of cooler units and n is greater than or equal to 2.

DETAILED DESCRIPTION

Figure 1:
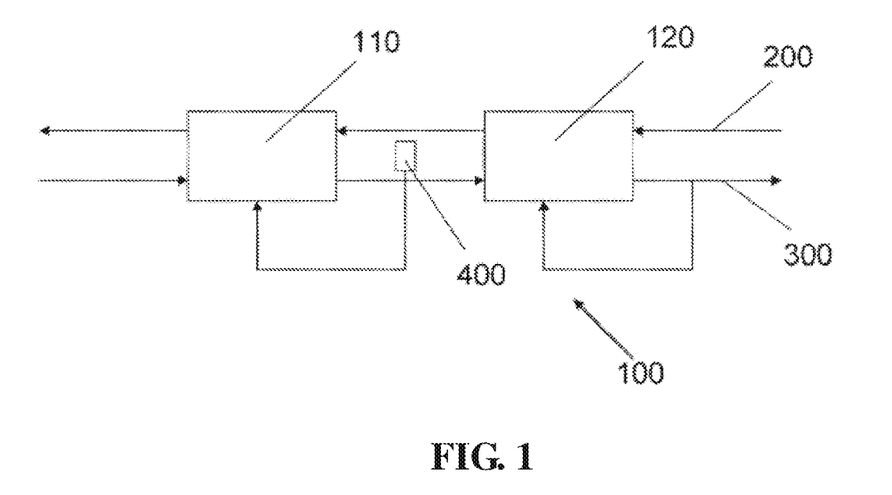
FIG. 1 illustrates a schematic diagram of one embodiment of the present invention.

As illustrated in FIG. 1, a cooler system 100 is illustrated, which is a commonly used cooler system consisting of two units which are connected in series. Specifically, the cooler system 100 comprises an upstream cooler unit 110 and a downstream cooler unit 120. A condensed water flow path 200 and a cooling water flow path 300 which sequentially pass through the cooler units are further arranged between the cooler units. Herein, flow directions of aqueous mediums in the condensed water flow path 200 and the cooling water flow path 300 are opposite. For example, in this embodiment, the aqueous medium in the condensed water flow path 200 sequentially flows through the downstream cooler unit 120 and the upstream cooler unit 110, so as to absorb heat produced in a water tower in each cooler unit; the aqueous medium in the cooling water flow path 300 sequentially flows through the upstream cooler unit 110 and the downstream cooler unit 120, so as to acquire cold produced in each cooler unit and to thereby act on a client side for refrigeration. For example, cooling water may carry cold to each room to exchange heat with air. Therefore, how to guarantee that the cooling water flow path 300 can stably and efficiently work is particularly important. In the cooler system 100 provided by this embodiment, arranged are a plurality of current sensors respectively used for detecting working currents of the cooler units; water temperature sensors (e.g., the number of water temperature sensors may be two) respectively used for detecting an entering water temperature Tenter and a leaving water temperature Tleave in the cooling water flow path 300 of the cooler system 100; at least one virtual temperature sensor 400 used for acquiring a middle water temperature on the cooling water flow path 300 between the cooler units; and a controller used for setting a middle water temperature set value and/or a leaving water temperature set valve and capable of adjusting a refrigeration capacity of the cooler units to enable the middle water temperature to be close or equal to the middle water temperature set value and/or to enable the leaving water temperature to be close or equal to the leaving water temperature set value. Specifically, since the operating condition of the upstream cooler unit 110 will directly influence the extent of temperature decrease which can be obtained by the aqueous medium in the cooling water flow path 300 when the aqueous medium flows through the upstream cooler unit 110, the operating condition of the upstream cooler unit 110 will directly influence an outflow temperature, i.e., the middle water temperature in this embodiment, of the aqueous medium in the cooling water flow path 300. Therefore, the controller is capable of adjusting the middle water temperature by adjusting the refrigeration capacity of the upstream cooler unit 110 to approximate the middle water temperature to an expected middle water temperature set value. For another example, since the operating condition of the downstream cooler unit 120 will directly influence the extent of temperature decrease which can be obtained by the aqueous medium in the cooling water flow path 300 when the aqueous medium flows through the downstream cooler unit 120, the operating condition of the downstream cooler unit 120 will directly influence an outflow temperature, i.e., the leaving water temperature in this embodiment, of the aqueous medium in the cooling water flow path 300. Therefore, the controller is capable of adjusting the leaving water temperature by adjusting the refrigeration capacity of the downstream cooler unit 120 to approximate the leaving water temperature to an expected leaving water temperature set value. Herein, it should be understood that the term "a plurality of" described in the present invention expresses a meaning "two or more". With respect to the above-mentioned embodiment, since the current of each cooler unit usually needs to be separately detected, the number of the plurality of current sensors should be equal to the number of the cooler units, i.e., usually two current sensors are arranged here. Of course, for the purpose of accuracy, more current sensors may also be arranged to acquire the current of the units by averaging a plurality of measurements. Similarly, it can be seen that the number of current sensors may also be increased for other purposes. In addition, since usually there is only one middle water temperature between every two cooler units, the number of the virtual temperature sensor is at least one. Of course, for the purpose of accuracy, more virtual temperature sensors may also be arranged to acquire the middle water temperature by averaging a plurality of measurements. Similarly, it can be seen that the number of virtual temperature sensors may also be increased for other purposes.

It should be pointed that the controller may implement the control of the refrigeration capacities of the units by controlling different components in the cooler units. Several implementation modes will be listed below for reference.

For example, the controller comprises a compressor inlet guide vane control module, and the compressor inlet guide vane control module is capable of controlling the opening of the compressor inlet guide vane to adjust the refrigeration capacity of the cooler unit. Specifically, when the refrigeration capacity of the cooler unit needs to be increased, the opening of the compressor inlet guide vane is increased; and contrarily, when the refrigeration capacity of the cooler unit needs to be decreased, the opening of the compressor inlet guide vane is decreased.

For another example, the controller further comprises a frequency converter control module and the frequency converter control module is capable of controlling the compressor operating frequency to adjust the refrigeration capacity of the cooler unit. Specifically, when the refrigeration capacity of the cooler unit needs to be increased, the compressor operating frequency is increased; and contrarily, when the refrigeration capacity of the cooler unit needs to be decreased, the compressor operating frequency is decreased.

For another example, the controller further comprises a hot gas bypass branch control module, and the hot gas bypass branch control module is capable of controlling conduction and disconnection of a hot gas bypass branch to adjust the refrigeration capacity of the cooler unit. Specifically, when the refrigeration capacity of the cooler unit needs to be increased, the hot gas bypass branch is conducted; and contrarily, when the refrigeration capacity of the cooler unit needs to be decreased, the hot gas bypass branch is disconnected.

Besides, since adjustment ranges, adjustment accuracy and response time lengths which can be provided by the above-mentioned several adjustment methods have differences, the effect is better if the above-mentioned control modules and the corresponding control methods are combined for use according to the requirements.

Figure 2:
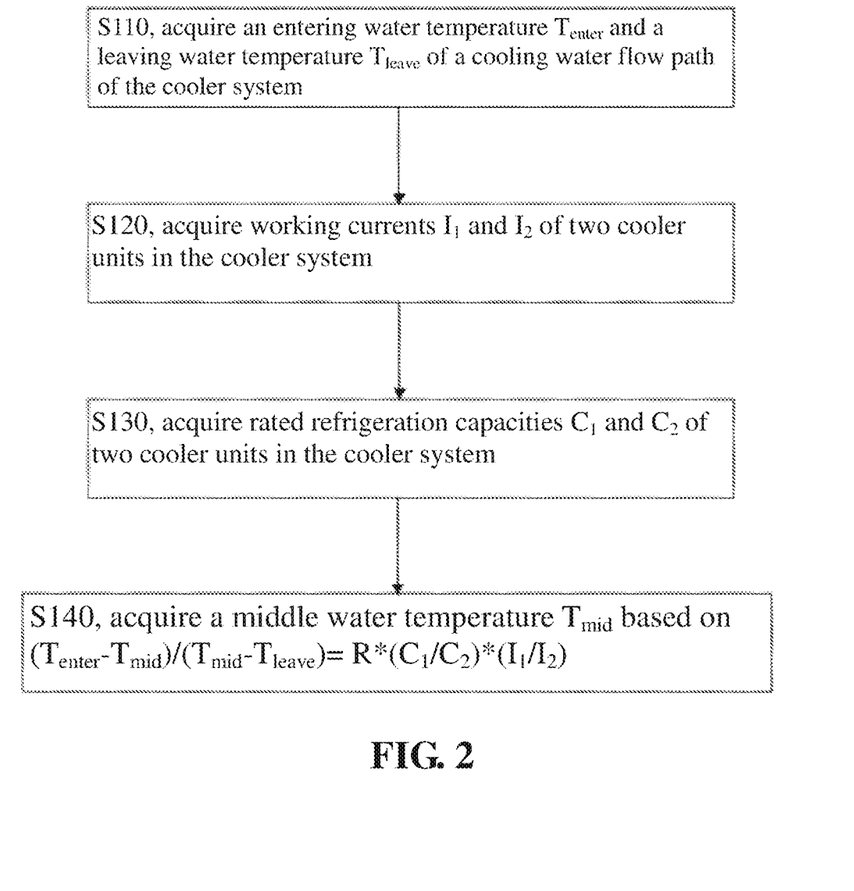
FIG. 2 illustrates a flowchart of one embodiment of a middle water temperature acquisition method provided by the present invention.

Based on the cooler system in the above-mentioned embodiment, the present invention further provides an embodiment of a method for acquiring a middle water temperature in the cooler system. Referring to FIG. 2, the middle water temperature acquisition method for the cooler system provided by this embodiment comprises the following steps: S110, acquiring an entering water temperature Tenter and a leaving water temperature Tleave of a cooling water flow path of the cooler system; S120, acquiring working currents I1 and I2 of two cooler units in the cooler system; S130, acquiring rated refrigeration capacities C1 and C2 of two cooler units in the cooler system; and S140, acquiring a middle water temperature Tmid based on R*(Tenter−Tmid)/(Tmid−Tleave)=(C1/C2)*(I1/I2). In the existing cooler refrigeration system, the refrigeration capacity of each cooler unit usually corresponds to an electric power consumed thereby. For example, as a nonrestrictive example, when a certain cooler unit consumes 1 kW power, it correspondingly can provide a 3 kW refrigeration capacity. Herein, specific numerical values may change according to energy efficiency ratios of different cooler units. On this basis, the electric power consumed by the cooler unit may be represented by the detected current; and the refrigeration capacity provided by the cooler unit may be represented by a temperature change difference of the cooling water which flows through the cooler unit. In other words, when rated refrigeration capacities of two cooler units are equal, a relation (Tenter−Tmid)/(Tmid−Tleave)=(I1/I2) may be obtained according to the above-mentioned process. After relevant parameters are acquired through steps S110, S120 and S130, the middle water temperature Tmid may be directly acquired through the above-mentioned relation. Since parameters such as an entering water temperature Tenter, a leaving water temperature Tleave and a working current of each unit also need to be used in the control of the cooler system in other aspects, the additional costs of parts are not increased for the cooler system which uses this method, and only the components of the controller thereof need to be correspondingly changed. Besides, in actual application, a correction coefficient R should be further set for the above-mentioned ratio relation, so as to make corrective compensation for various unideal conditions or other problems which possibly occur. Under an ideal condition, R=1.

Herein, it is not necessary to execute the above-mentioned steps S110, S120 and S130 for acquiring parameters according to the sequence provided in this embodiment. Since the methods for acquiring the three groups of parameters have no inevitable correlation, these parameters may be acquired simultaneously or according to any sequence.

It should be pointed out that the above-mentioned middle water temperature acquisition method may also be applied to two cooler units with different rated refrigeration capacities. At this moment, a ratio of the rated refrigeration capacities of the two cooler units further needs to be considered in a calculation process, i.e., (Tenter−Tmid1)/(Tmid1−Tleave)=R*(C1/C2)*(I1/I2). Herein, the rated refrigeration capacities of the two cooler units described above are the same, i.e., C1/C2=1. Besides, when a rated refrigeration capacity C1 of an upstream cooler unit 110 is greater than a rated refrigeration capacity C2 of a downstream cooler unit 120, C1/C2>1; or when a rated refrigeration capacity C1 of an upstream cooler unit 110 is smaller than a rated refrigeration capacity C2 of a downstream cooler unit 120, C1/C2<1. The above-mentioned control processes are all used for acquiring the middle water temperature of the cooler system, so as to provide parameters required for further system control. When the above-mentioned control method is applied to a conventional cooler system with no middle water temperature sensor, the middle water temperature of the conventional cooler system can be acquired, the material costs are effectively reduced and complex modifications to intrinsic layout spaces and layout forms are avoided. In addition, the control method may also be applied to a cooler system in which a middle water temperature sensor has already been arranged. At this moment, the middle water temperature is acquired through the virtual temperature sensor, and comparison calibration of the sensing results of the actual middle water temperature sensor can be realized, so as to find a fault and perform maintenance in time.

Figure 3:
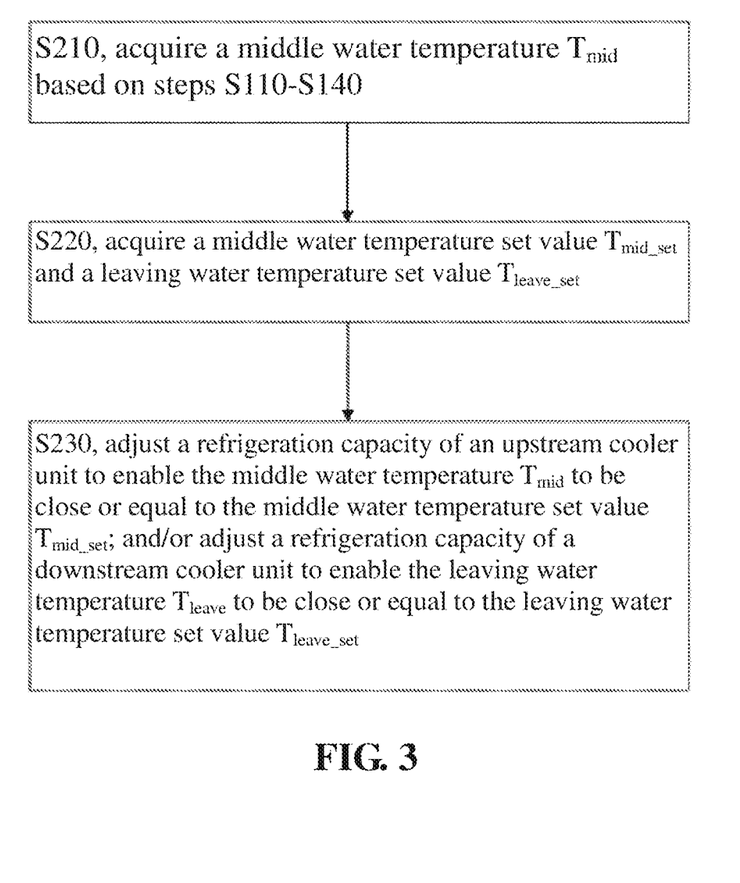
FIG. 3 illustrates a flowchart of one embodiment of a control method for a cooler system provided by the present invention.

Based on the embodiment of the cooler system and the embodiment of the method for acquiring the middle water temperature, the present invention further provides a control method for the cooler system. Referring to FIG. 3, the control method comprises the following steps: S210, acquiring a middle water temperature Tmid1 based on the above-mentioned middle water temperature acquisition method; S220, acquiring a middle water temperature set value Tmid1_set and a leaving water temperature set value Tleave_set; and S230, adjusting a refrigeration capacity of an upstream cooler unit 110 to enable the middle water temperature Tmid1 to be close or equal to the middle water temperature set value Tmid1_set; and/or adjusting a refrigeration capacity of a downstream cooler unit 120 to enable the leaving water temperature Tleave to be close or equal to the leaving water temperature set value Tleave_set. The main thought of this method is to respectively compare the middle water temperature and the leaving water temperature with set values, and correspondingly adjust the refrigeration capacities of the units to enable the temperature to continuously approach and be equal to the set values according to the actual situations that they are greater than or smaller than the set values, so as to realize an expected optimum operating state, satisfy the refrigeration demands, balance the operating load between the cooler units at the same time and improve the system stability.

All steps of this method will be specifically described below. Herein, for step S210, the control principle, the operation process and the acquired result thereof have already been described in detail in the above-mentioned middle water temperature acquisition method, and thus are not repetitively described here.

For step S220, two parameters, i.e., a middle water temperature set value Tmid1_set and a leaving water temperature set value Tleave_set, need to be acquired. Herein, with respect to the leaving water temperature set value Tleave_set, a user may perform setting according to the actual use requirements. With respect to the middle water temperature set value Tmid1_set, it may be calculated according to Tmid1_set=K*(C1/C2)*(Tenter+Tleave_set)/2. Besides, K is a correction factor which is set aiming at actual applications, so as to make corrective compensation for various unideal conditions or other problems which possibly occur. Under an ideal condition, K=1.

For step S230, the control of the refrigeration capacities of the units may be implemented by controlling different components in the cooler units. Several control implementation modes will be listed below for reference.

For example, the refrigeration capacity of the upstream cooler unit 110 and/or the downstream cooler unit 120 may be adjusted by adjusting a compressor inlet guide vane to enable the middle water temperature Tmid1 to be close or equal to the middle water temperature set value Tmid1_set and/or to enable the leaving water temperature Tleave to be close or equal to the leaving water temperature set value Tleave_set. Specifically, when the middle water temperature Tmid1 is smaller than the middle water temperature set value Tmid1_set, the refrigeration capacity of the cooler unit needs to be decreased, and at this moment the refrigeration capacity of the upstream cooler unit 110 is decreased by decreasing the opening of the compressor inlet guide vane of the upstream cooler unit 110 to enable the middle water temperature Tmid1 to rise to be equal to the middle water temperature set value Tmid1_set; and/or when the middle water temperature Tmid1 is greater than the middle water temperature set value Tmid1_set, the refrigeration capacity of the cooler unit needs to be increased, and at this moment the refrigeration capacity of the upstream cooler unit 110 is increased by increasing the opening of the compressor inlet guide vane of the upstream cooler unit 110 to enable the middle water temperature Tmid1 to drop to be equal to the middle water temperature set value Tmid1_set.

Based on the same principle, the adjustment of the leaving water temperature may also be controlled by using the above-mentioned control method. When the leaving water temperature Tleave is smaller than the leaving water temperature set value Tleave_set, the refrigeration capacity of the downstream cooler unit 120 is decreased by decreasing the opening of the compressor inlet guide vane of the downstream cooler unit 120 to enable the leaving water temperature Tleave to rise to be equal to the leaving water temperature set value Tleave_set; and/or when the leaving water temperature Tleave is greater than the leaving water temperature set value Tleave_set, the refrigeration capacity of the downstream cooler unit 120 is increased by increasing the opening of the compressor inlet guide vane of the downstream cooler unit 120 to enable the leaving water temperature Tleave to drop to be equal to the leaving water temperature set value Tleave_set.

For another example, the refrigeration capacity of the upstream cooler unit 110 and/or the downstream cooler unit 120 may be adjusted by controlling a frequency converter and/or a hot gas bypass branch to enable the middle water temperature Tmid1 to be close or equal to the middle water temperature set value Tmid1_set and/or to enable the leaving water temperature Tleave to be close or equal to the leaving water temperature set value Tleave_set.

Specifically, when the middle water temperature Tmid1 is smaller than the middle water temperature set value Tmid1_set, the refrigeration capacity of the cooler unit needs to be decreased, and at this moment the refrigeration capacity of the upstream cooler unit 110 is decreased by decreasing the compressor operating frequency of the upstream cooler unit 110 and/or conducting the hot gas bypass branch to enable the middle water temperature Tmid1 to rise to be equal to the middle water temperature set value Tmid1_set; and/or when the middle water temperature Tmid1 is greater than the middle water temperature set value Tmid1_set, the refrigeration capacity of the cooler unit 110 needs to be increased, and at this moment the refrigeration capacity of the upstream cooler unit 110 is increased by increasing the compressor operating frequency of the upstream cooler unit 110 and/or disconnecting the hot gas bypass branch to enable the middle water temperature Tmid1 to drop to be equal to the middle water temperature set value Tmid1_set.

Based on the same principle, the adjustment of the leaving water temperature may also be controlled by using the above-mentioned control method. When the leaving water temperature Tleave is smaller than the leaving water temperature set value Tleave_set, the refrigeration capacity of the cooler unit needs to be decreased, and at this moment the refrigeration capacity of the downstream cooler unit 120 is decreased by decreasing the compressor operating frequency of the downstream cooler unit 120 and/or conducting the hot gas bypass branch to enable the leaving water temperature Tleave to rise to be equal to the leaving water temperature set value Tleave_set; and/or when the leaving water temperature Tleave is greater than the leaving water temperature set value Tleave_set, the refrigeration capacity of the cooler unit 110 needs to be increased, and at this moment the refrigeration capacity of the downstream cooler unit 120 is increased by increasing the compressor operating frequency of the downstream cooler unit 120 and/or disconnecting the hot gas bypass branch to enable the leaving water temperature Tleave to drop to be equal to the leaving water temperature set value Tleave_set.

Besides, since adjustment ranges, adjustment accuracy and response time lengths which can be provided by the above-mentioned several adjustment methods have differences, the effect is better if the above-mentioned control methods are combined for use according to the requirements.

According to the teaching and principle of the above-mentioned embodiments, it can be seen that the concept of the present invention may also be applied to a cooler system, in which more than two cooler units, e.g., three or more cooler units, are connected in series. Here, an embodiment of a cooler system with three cooler units connected in series is further provided for reference.

Figure 4:
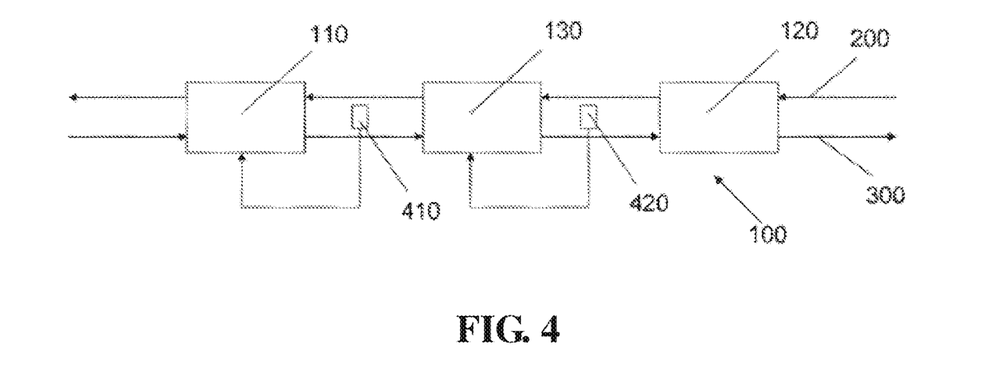
FIG. 4 illustrates a schematic diagram of another embodiment of the present invention.

As illustrated in FIG. 4, a cooler system 100' is illustrated and is a cooler system consisting of three units which are connected in series. Specifically, the cooler system 100' comprises a first upstream cooler unit 110, a second upstream cooler unit 130 and a downstream cooler unit 120. A condensed water flow path 200 and a cooling water flow path 300 which sequentially pass through the cooler units are further arranged between the cooler units. Herein, flow directions of aqueous mediums in the condensed water flow path 200 and the cooling water flow path 300 are opposite. For example, in this embodiment, the aqueous medium in the condensed water flow path 200 sequentially flows through the downstream cooler unit 120, the second upstream cooler unit 130 and the first upstream cooler unit 110, so as to absorb heat produced in each cooler unit; the aqueous medium in the cooling water flow path 300 sequentially flows through the first upstream cooler unit 110, the second upstream cooler unit 130 and the downstream cooler unit 120, so as to acquire cold produced in each cooler unit and act on a client side for refrigeration. Similar to the above-mentioned embodiment, in the cooler system 100' provided by this embodiment, also arranged are a plurality of current sensors respectively used for detecting working currents of the cooler units; water temperature sensors (e.g., the number of water temperature sensors may be two) respectively used for detecting an entering water temperature Tenter and a leaving water temperature Tleave in the cooling water flow path 300 of the cooler system 100; a first virtual temperature sensor 410 and a second virtual temperature sensor 420 used for acquiring a middle water temperature on the cooling water flow path 300 between the cooler units; and a controller used for setting a first middle water temperature set value, a second middle water temperature set value and/or a leaving water temperature set valve and capable of adjusting refrigeration capacities of the three cooler units to enable any middle water temperature to be close or equal to the middle water temperature set value and/or to enable the leaving water temperature to be close or equal to the leaving water temperature set value. Specifically, since the operating condition of the first upstream cooler unit 110 will directly influence the extent of temperature decrease which can be obtained by the aqueous medium in the cooling water flow path 300 when the aqueous medium flows through the first upstream cooler unit 110, the operating situation of the first upstream cooler unit 110 will directly influence the outflow temperature, i.e., the first middle water temperature in this embodiment, of the aqueous medium in the cooling water flow path 300. Therefore, the controller is capable of adjusting the first middle water temperature by adjusting the refrigeration capacity of the first upstream cooler unit 110 to enable the first middle water temperature to be close or equal to the expected first middle water temperature set value. For another example, since the operating condition of the second upstream cooler unit 130 will directly influence the extent of temperature decrease which can be obtained by the aqueous medium in the cooling water flow path 300 when the aqueous medium flows through the second upstream cooler unit 130, the operating situation of the second upstream cooler unit 130 will directly influence the outflow temperature, i.e., the second middle water temperature in this embodiment, of the aqueous medium in the cooling water flow path 300. Therefore, the controller is capable of adjusting the second middle water temperature by adjusting the refrigeration capacity of the second upstream cooler unit 130 to enable the second middle water temperature to be close or equal to the expected second middle water temperature set value. For another example, since the operating condition of the downstream cooler unit 120 will directly influence the extent of temperature decrease which can be obtained by the aqueous medium in the cooling water flow path 300 when the aqueous medium flows through the downstream cooler unit 120, the operating situation of the downstream cooler unit 120 will directly influence the outflow temperature, i.e., the leaving water temperature in this embodiment, of the aqueous medium in the cooling water flow path 300. Therefore, the controller is capable of adjusting the leaving water temperature by adjusting the refrigeration capacity of the downstream cooler unit 120 to enable the leaving water temperature to be close or equal to the expected leaving water temperature set value.

It also should be pointed that the controller may implement the control of the refrigeration capacities of the units by controlling different components in the cooler units. For example, the controller comprises a compressor inlet guide vane control module, a frequency converter control module and/or a hot gas bypass branch control module, and has control methods similar to that in the above-mentioned embodiments, which are thus not repetitively described here. Similarly, since adjustment ranges, adjustment accuracy and response time lengths which can be provided by the above-mentioned several adjustment methods have differences, the effect is better if the above-mentioned control modules and the corresponding control methods are combined for use according to the requirements.

Figure 5:
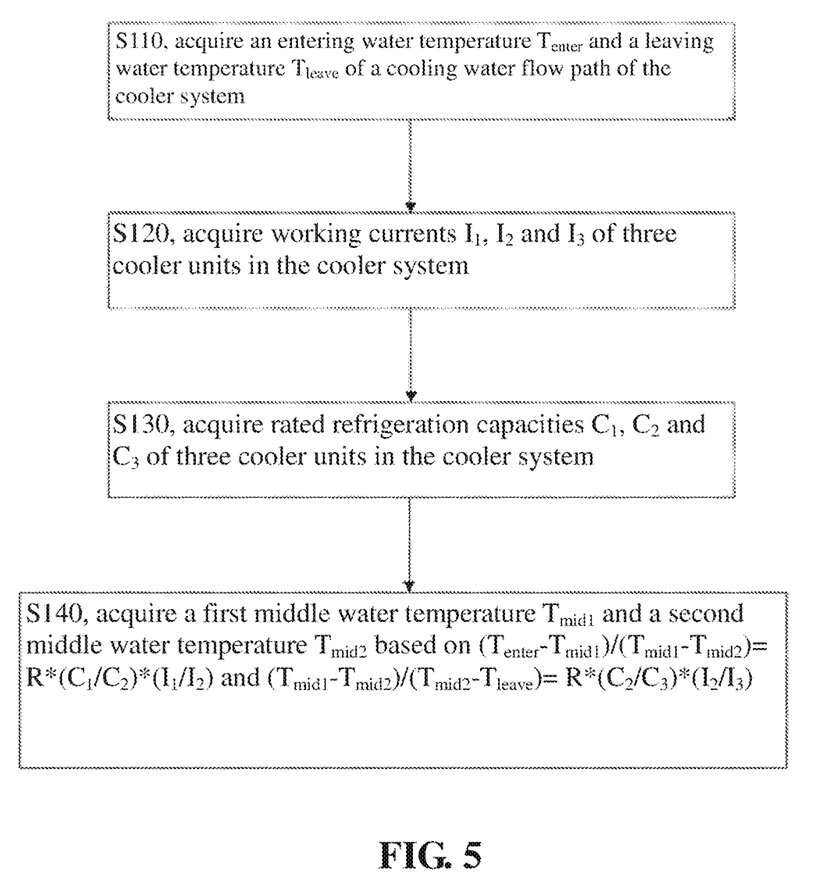
FIG. 5 illustrates a flowchart of another embodiment of a middle water temperature acquisition method provided by the present invention.

Based on the cooler system in the above-mentioned embodiment, the present invention further provides an embodiment of a method for acquiring a middle water temperature in the cooler system. Referring to FIG. 5, the middle water temperature acquisition method for the cooler system provided by this embodiment comprises the following steps: S110, acquiring an entering water temperature Tenter and a leaving water temperature Tleave of a cooling water flow path of the cooler system; S120, acquiring working currents I1, I2 and I3 of three cooler units in the cooler system; S130, acquiring rated refrigeration capacities C1, C2 and C3 of three cooler units in the cooler system; and S140, acquiring a first middle water temperature Tmid1 and a second middle water temperature Tmid2 based on (Tenter−Tmid1)/(Tmid1−Tmid2)=R*(C1/C2)*(I1/I2) and (Tmid1−Tmid2)/(Tmid2−Tleave)=R*(C2/C3)*(I2/I3). Based on the same principle, the refrigeration capacity of each cooler unit usually corresponds to the electric power consumed thereby. Therefore, the electric power consumed by the cooler unit may also be represented by the detected current; and the refrigeration capacity provided by the cooler unit may also be represented by a temperature change difference of the cooling water which flows through the cooler unit. In other words, when rated refrigeration capacities of three cooler units are equal, two expressions (Tenter−Tmid1)/(Tmid1−Tmid2)=(I1/I2) and (Tmid1−Tmid2)/(Tmid2−Tleave)=(I2/I3) may be obtained according to the above-mentioned process. After relevant parameters are acquired through steps S110, S120 and S130, two parameters, i.e., the first middle water temperature Tmid1 and the second middle water temperature Tmid2, may be acquired through the above-mentioned relations. Since parameters such as an entering water temperature Tenter, a leaving water temperature Tleave and a working current of each unit also need to be used in the control of the cooler system in other aspects, the additional costs of parts are not increased for the cooler system which uses this method and the components of the controller thereof only need to be correspondingly changed. Besides, in actual application, a correction coefficient R should be further set for the above-mentioned ratio relations, so as to make corrective compensation for various unideal conditions or other problems which possibly occur. Under an ideal condition, R=1.

Herein, it is not necessary to execute steps S110, S120 and S130 for acquiring the above-mentioned parameters according to the sequence provided in this embodiment. Since the methods for acquiring the three groups of parameters have no inevitable correlation, these parameters may be acquired simultaneously or according to any sequence.

It should be pointed out that the above-mentioned middle water temperature acquisition method may also be applied to three cooler units with different rated refrigeration capacities. At this moment, a ratio of the rated refrigeration capacities of the three cooler units further needs to be considered in a calculation process, i.e., (Tenter−Tmid1)/(Tmid1−Tmid2)=R*(C1/C2)*(I1/I2) and (Tmid1−Tmid2)/(Tmid2−Tleave)=R*(C2/C3)*(I2/I3). Herein, the rated refrigeration capacities of the three cooler units described above are the same, i.e., C1/C2=C2/C3=1. Besides, when a rated refrigeration capacity C1 of a first upstream cooler unit 110 is greater than a rated refrigeration capacity C2 of a second upstream cooler unit 130, C1/C2>1; or when a rated refrigeration capacity C1 of a first upstream cooler unit 110 is smaller than a rated refrigeration capacity C2 of a second upstream cooler unit 120, C1/C2<1; and/or when a rated refrigeration capacity C2 of a second upstream cooler unit 130 is greater than a rated refrigeration capacity C3 of a downstream cooler unit 120, C2/C3>1; or when a rated refrigeration capacity C2 of a second upstream cooler unit 130 is smaller than a rated refrigeration capacity C3 of a downstream cooler unit 120, C2/C3<1. The above-mentioned control processes are all used for acquiring the middle water temperature of the cooler system, so as to provide parameters required for further system control. When the above-mentioned control method is applied to a conventional cooler system with no middle water temperature sensor, the middle water temperature of the conventional cooler system can be acquired, the material costs are effectively reduced and complex modifications to intrinsic layout spaces and layout forms are avoided. Similarly, in addition, the control method may also be applied to a cooler system in which a middle water temperature sensor has already been arranged. At this moment, the middle water temperature is acquired through the virtual temperature sensor, and comparison calibration of the sensing results of the actual middle water temperature sensor can be realized, so as to find a fault and perform maintenance in time.

Figure 6:
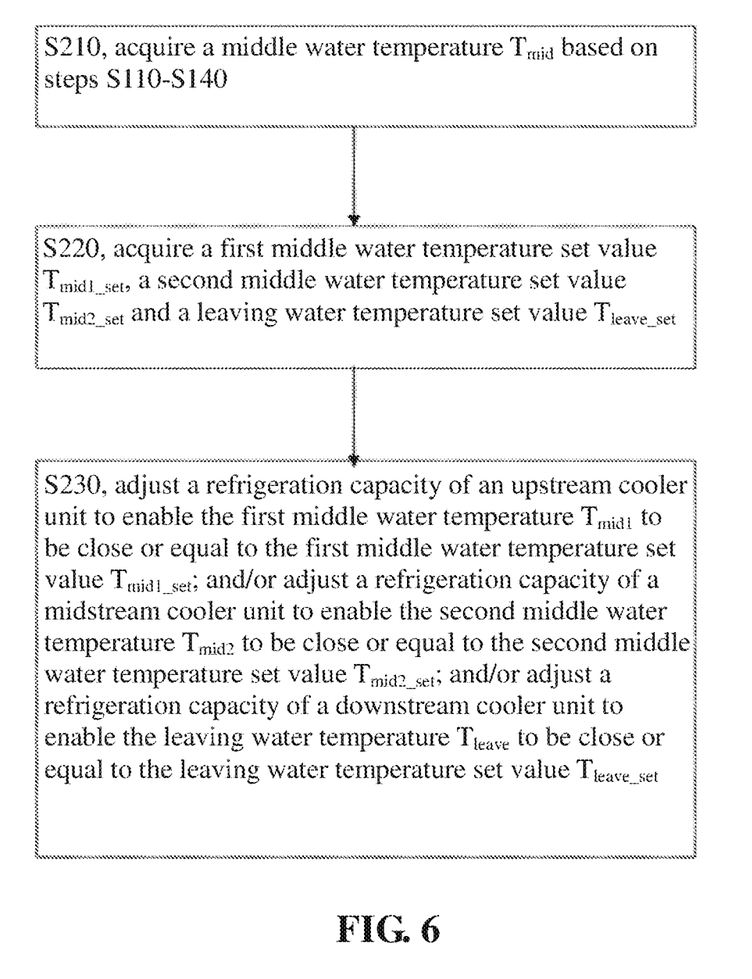
FIG. 6 illustrates a flowchart of another embodiment of a control method for a cooler system provided by the present invention.

Based on the embodiment of the cooler system and the embodiment of the method for acquiring the middle water temperature, the present invention further provides a control method for the cooler system. Referring to FIG. 6, the control method further comprises the following steps: S210, acquiring a first middle water temperature Tmid1 and a second middle water temperature Tmid2 based on the above-mentioned middle water temperature acquisition method; S220, acquiring a first middle water temperature set value Tmid1_set, a second middle water temperature set value Tmid2_set and a leaving water temperature set value Tleave_set; and S230, adjusting a refrigeration capacity of a first upstream cooler unit 110 to enable the first middle water temperature Tmid1 to be close or equal to the first middle water temperature set value Tmid1_set; and/or adjusting a refrigeration capacity of a second upstream cooler unit 130 to enable the second middle water temperature Tmid2 to be close or equal to the second middle water temperature set value Tmid2_set; and/or adjusting a refrigeration capacity of a downstream cooler unit 120 to enable the leaving water temperature Tleave to be close or equal to the leaving water temperature set value Tleave_set. This method may also respectively compare the middle water temperature and the leaving water temperature with set values, and correspondingly adjust the refrigeration capacities of the units to enable the temperatures to continuously approach and be equal to the set values according to the specific situations that they are greater than or smaller than the set values, so as to realize an expected optimum operating state, satisfy the refrigeration demands, balance the operating load between the cooler units at the same time and improve the system stability.

All steps of this method will be specifically described below. Herein, for step S210, the control principle, the operation process and the acquired result thereof have already been described in detail in the above-mentioned middle water temperature acquisition method, and thus are not repetitively described here.

For step S220, two parameters, i.e., a first middle water temperature set value Tmid1_set, a second middle water temperature set value Tmid2_set and a leaving water temperature set value Tleave_set, need to be acquired. Herein, with respect to the leaving water temperature set value Tleave_set, a user may also perform setting according to the actual use requirements. With respect to the first middle water temperature set value Tmid1_set and the second middle water temperature set value Tmid2_set, they may be acquired according to the following relations: The first middle water temperature set value Tmid1_set= K*(C1/C2)*(Tenter+Tmid2_set)/2; and the second middle water temperature set value Tmid2_set=K*(C2/C3)* (Tmid1_set+Tleave_set)/2. Besides, K is a correction factor which is set aiming at actual applications, so as to make corrective compensation for various unideal conditions or other problems which possibly occur. Under an ideal condition, K=1.

For step S230, similar to the above-mentioned embodiment, the control of the refrigeration capacities of the units may also be implemented by controlling different components in the cooler units. Several control implementation modes will be listed below for reference.

For example, the refrigeration capacity of the first upstream cooler unit 110, and/or the refrigeration capacity of the second upstream cooler unit 130 and/or the downstream cooler unit 120 may be adjusted by adjusting a compressor inlet guide vane to enable the first middle water temperature Tmid1 to be close or equal to the first middle water temperature set value Tmid1_set and/or to enable the second middle water temperature Tmid2 to be close or equal to the second middle water temperature set value Tmid2_set and/ or to enable the leaving water temperature Tleave to be close or equal to the leaving water temperature set value Tleave_set. Specifically, when the first middle water temperature Tmid1 is smaller than the first middle water temperature set value Tmid1_set, the refrigeration capacity of the first upstream cooler unit 110 needs to be decreased, and at this moment the refrigeration capacity of the first upstream cooler unit 110 is decreased by decreasing the opening of the compressor inlet guide vane of the first upstream cooler unit 110 to enable the first middle water temperature Tmid1 to rise to be equal to the first middle water temperature set value Tmid1_set; and/or when the first middle water temperature Tmid1 is greater than the first middle water temperature set value Tmid1_set, the refrigeration capacity of the first upstream cooler unit 110 needs to be increased, and at this moment the refrigeration capacity of the first upstream cooler unit 110 is increased by increasing the opening of the compressor inlet guide vane of the first upstream cooler unit 110 to enable the first middle water temperature Tmid1 to drop to be equal to the first middle water temperature set value Tmid1_set; and/or when the second middle water temperature Tmid2 is smaller than the second middle water temperature set value Tmid2_set, the refrigeration capacity of the second upstream cooler unit 130 needs to be decreased, and at this moment the refrigeration capacity of the second upstream cooler unit 130 is decreased by decreasing the opening of the compressor inlet guide vane of the second upstream cooler unit 130 to enable the second middle water temperature Tmid2 to rise to be equal to the second middle water temperature set value Tmid2_set; and/or when the second middle water temperature Tmid2 is greater than the second middle water temperature set value Tmid2_set, the refrigeration capacity of the second upstream cooler unit 130 needs to be increased, and at this moment the refrigeration capacity of the second upstream cooler unit 130 is increased by increasing the opening of the compressor inlet guide vane of the second upstream cooler unit 130 to enable the second middle water temperature Tmid2 to drop to be equal to the second middle water temperature set value Tmid2_set.

Based on the same principle, the adjustment of the leaving water temperature may also be controlled by using the above-mentioned control method. When the leaving water temperature Tleave is smaller than the leaving water temperature set value Tleave_set, the refrigeration capacity of the downstream cooler unit 120 is decreased by decreasing the opening of the compressor inlet guide vane of the downstream cooler unit 120 to enable the leaving water temperature Tleave to rise to be equal to the leaving water temperature set value Tleave_set; and/or when the leaving water temperature Tleave is greater than the leaving water temperature set value Tleave_set, the refrigeration capacity of the downstream cooler unit 120 is increased by increasing the opening of the compressor inlet guide vane of the downstream cooler unit 120 to enable the leaving water temperature Tleave to drop to be equal to the leaving water temperature set value Tleave_set.

For another example, the refrigeration capacity of the first upstream cooler unit 110 and/or the second upstream cooler unit 130 and/or the downstream cooler unit 120 may be adjusted by controlling a frequency converter and/or a hot gas bypass branch to enable the first middle water temperature Tmid1 to be close or equal to the first middle water temperature set value Tmid1_set, and/or to enable the second middle water temperature Tmid2 to be close or equal to the second middle water temperature set value Tmid2_set and/or to enable the leaving water temperature Tleave to be close or equal to the leaving water temperature set value Tleave_set.

Specifically, when the first middle water temperature Tmid1 is smaller than the first middle water temperature set value Tmid1_set, the refrigeration capacity of the cooler unit needs to be decreased, and at this moment the refrigeration capacity of the first upstream cooler unit 110 is decreased by decreasing the compressor operating frequency of the first upstream cooler unit 110 and/or conducting the hot gas bypass branch to enable the first middle water temperature Tmid1 to rise to be equal to the first middle water temperature set value Tmid1_set; and/or when the first middle water temperature Tmid1 is greater than the first middle water temperature set value Tmid1_set, the refrigeration capacity of the cooler unit needs to be increased, and at this moment the refrigeration capacity of the first upstream cooler unit 110 is increased by increasing the compressor operating frequency of the first upstream cooler unit 110 and/or disconnecting the hot gas bypass branch to enable the first middle water temperature Tmid1 to drop to be equal to the first middle water temperature set value Tmid1_set; and/or when the second middle water temperature Tmid2 is smaller than the second middle water temperature set value Tmid2_set, the refrigeration capacity of the cooler unit needs to be decreased, and at this moment the refrigeration capacity of the second upstream cooler unit 130 is decreased by decreasing the compressor operating frequency of the second upstream cooler unit 130 and/or conducting the hot gas bypass branch to enable the second middle water temperature Tmid2 to rise to be equal to the second middle water temperature set value Tmid2_set; and/or when the second middle water temperature Tmid2 is greater than the second middle water temperature set value Tmid2_set, the refrigeration capacity of the cooler unit needs to be increased, and at this moment the refrigeration capacity of the second upstream cooler unit 130 is increased by increasing the compressor operating frequency of the second upstream cooler unit 130 and/or disconnecting the hot gas bypass branch to enable the second middle water temperature Tmid2 to drop to be equal to the second middle water temperature set value Tmid2_set.

Based on the same principle, the adjustment of the leaving water temperature may also be controlled by using the above-mentioned control method.

When the leaving water temperature Tleave is smaller than the leaving water temperature set value Tleave_set, the refrigeration capacity of the cooler unit needs to be decreased, and at this moment the refrigeration capacity of the downstream cooler unit 120 is decreased by decreasing the compressor operating frequency of the downstream cooler unit 120 and/or conducting the hot gas bypass branch to enable the leaving water temperature Tleave to rise to be equal to the leaving water temperature set value Tleave_set; and/or when the leaving water temperature Tleave is greater than the leaving water temperature set value Tleave_set, the refrigeration capacity of the cooler unit needs to be increased, and at this moment the refrigeration capacity of the downstream cooler unit 120 is increased by increasing the compressor operating frequency of the downstream cooler unit 120 and/or disconnecting the hot gas bypass branch to enable the leaving water temperature Tleave to drop to be equal to the leaving water temperature set value Tleave_set.

Besides, since adjustment ranges, adjustment accuracy and response time lengths which can be provided by the above-mentioned several adjustment methods have differences, the effect is better if the above-mentioned control methods are combined for use according to the requirements.

In addition, according to the teaching of the above-mentioned embodiments, it can be seen that the above-mentioned middle water temperature acquisition method may also be applied to a cooler system with more cooler units.

Figure 7:
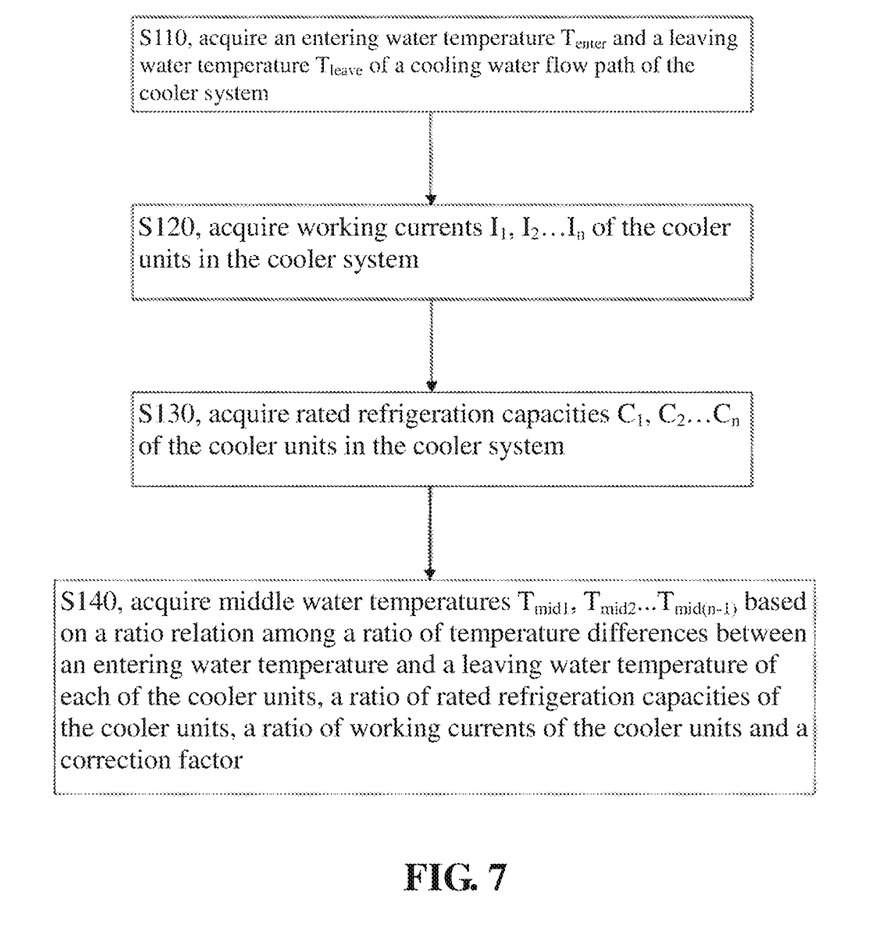
FIG. 7 illustrates a flowchart of another embodiment of a middle water temperature acquisition method provided by the present invention.

Referring to FIG. 7, specifically, when the middle water temperature acquisition method is applied to a plurality of cooler units, the middle water temperature acquisition method for the cooler system comprises the following steps: S110, acquiring an entering water temperature Tenter and a leaving water temperature Tleave of a cooling water flow path of the cooler system; S120, acquiring working currents I1, I2 . . . In of the cooler units in the cooler system; S130, acquiring rated refrigeration capacities C1, C2 . . . Cn of the cooler units in the cooler system; and S140, acquiring middle water temperatures Tmid1, Tmid2 . . . Tmid(n-1) based on a ratio relation among a ratio of temperature differences between an entering water temperature and a leaving water temperature of each of the cooler units, a ratio of rated refrigeration capacities of the cooler units, a ratio of working currents of the cooler units and a correction factor, where n is the number of cooler units and n is greater than or equal to 2. In a general cooler refrigeration system, the refrigeration capacity of each cooler unit usually corresponds to the electric power consumed thereby. For example, as a nonrestrictive example, when a certain cooler unit consumes 1 kW power, it correspondingly can provide a 3 kW refrigeration capacity. Herein, specific numerical values may change according to energy efficiency ratios of different cooler units. On this basis, the electric power consumed by the cooler unit may be represented by the detected current; and the refrigeration capacity provided by the cooler unit may be represented by a temperature change difference of the cooling water which flows through the cooler unit. In other words, the difference between the entering water temperature and the leaving water temperature of each cooler unit has a corresponding relation with the current consumed thereby. Herein, it needs to be stated that, for the first upstream cooler unit, the difference between the entering water temperature and the leaving water temperature thereof is Tenter−Tmid1; for each of other upstream cooler units, the difference between the entering water temperature and the leaving water temperature thereof is a difference between middle water temperatures at upstream and downstream positions of the upstream cooler unit; and for the downstream cooler unit, the difference between the entering water temperature and the leaving water temperature thereof is Tmid(n-1)−Tleave. In addition, this relation is also correlated to the rated refrigeration capacity of each cooler unit. Therefore, after relevant parameters are acquired through steps S110, S120 and S130, the middle water temperatures Tmid1, Tmid2 . . . Tmid(n-1) may be acquired through the above-mentioned relations. As an example, the relations are: (Tenter−Tmid1)/(Tmid1−Tmid2)=(C1/C2)*(I1/I2); (Tmid1−Tmid2)/(Tmid2−Tmid3)=(C2/C3)*(I2/I3); . . . ; (Tmid1−Tmid2)/(Tmid(n-1)−Tleave)=(Cn−1/Cn)*(In−1/In).

Besides, in actual applications, a correction coefficient R should be further set for the above-mentioned ratio relations, so as to make corrective compensation for various unideal conditions or other problems which possibly occur. Under an ideal condition, R=1. Since parameters such as an entering water temperature Tenter, a leaving water temperature Tleave and a working current of each unit also need to be used in the control of the cooler system in other aspects, the additional costs of parts are not increased for the cooler system which uses this method and the components of the controller thereof only need to be correspondingly changed.

Figure 8:
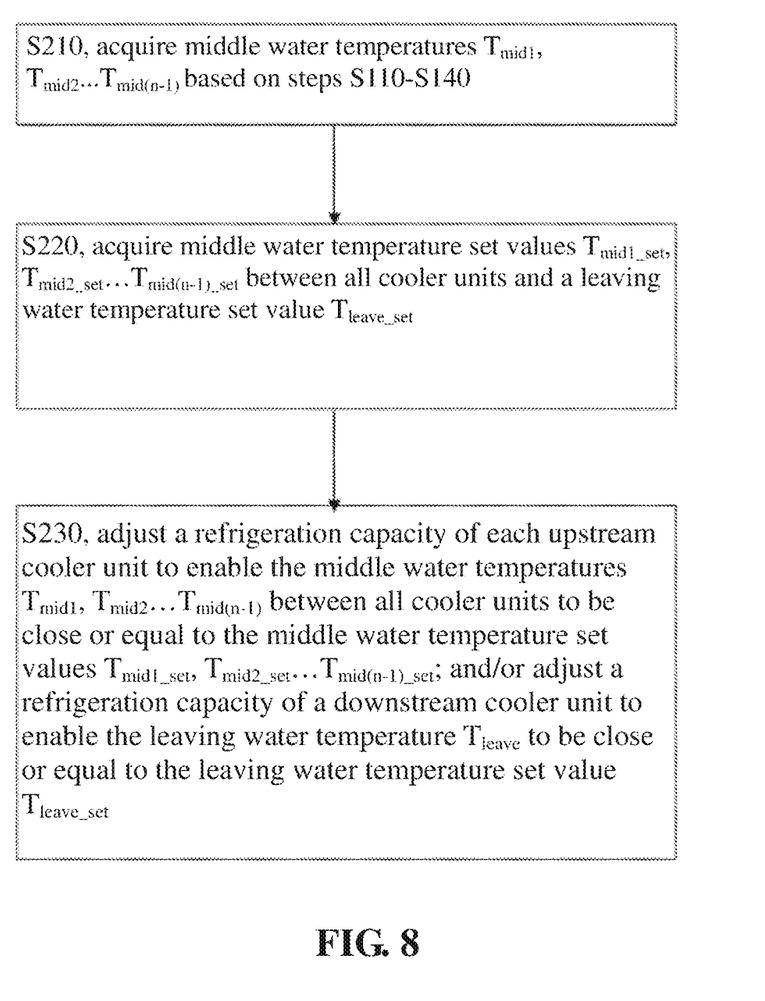
FIG. 8 illustrates a flowchart of another embodiment of a control method for a cooler system provided by the present invention.

Referring to FIG. 8, when the control method is applied to a plurality of cooler units, the control method for the cooler system comprises the following steps: S210, acquiring an entering water temperature Tenter and a leaving water temperature Tleave of a cooling water flow path of the cooler system; acquiring working currents I1, I2 . . . In of the cooler units in the cooler system; acquiring rated refrigeration capacities C1, C2 . . . Cn of the cooler units in the cooler system; and acquiring middle water temperatures Tmid1, Tmid2 . . . Tmid(n-1) based on a ratio relation among a ratio of temperature differences between an entering water temperature and a leaving water temperature of each of the cooler units, a ratio of rated refrigeration capacities of the cooler units, a ratio of working currents of the cooler units and a correction factor; S220, acquiring middle water temperature set values Tmid1_set, Tmid2_set . . . Tmid(n-1)_set between all cooler units and a leaving water temperature set value Tleave_set; and S230, adjusting a refrigeration capacity of each upstream cooler unit to enable the middle water temperatures Tmid1, Tmid2 . . . Tmid(n-1) between all cooler units to be close or equal to the middle water temperature set values Tmid1_set, Tmid2_set . . . Tmid(n-1)_set; and/or adjusting a refrigeration capacity of a downstream cooler unit to enable the leaving water temperature Tleave to be close or equal to the leaving water temperature set value Tleave_set, where n is the number of cooler units. In this method, the middle water temperature and the leaving water temperature can be respectively compared with set values, and the refrigeration capacities of the units are correspondingly adjusted to enable the temperatures to continuously approach and be equal to the set values according to the actual situations that they are greater than or smaller than the set values, so as to realize an expected optimum operating state, satisfy the refrigeration demands, balance the operating load between the cooler units at the same time and improve the system stability.

For step S220, the middle water temperature set values Tmid1_set, Tmid2_set . . . Tmid(n-1)_set are acquired based on a plurality of ration relations between a ratio of a sum of an entering water temperature and a leaving water temperature of each cooler unit and a ratio of rated refrigeration capacities of the cooler units. As an example, these ratio relations are: Tmid1_set=K*(C1/C2)*(Tenter+Tmid2_set)/2; Tmid2_set=K*(C2/C3)*(Tmid1_set+Tmid3_set)/2; . . . ; Tmid(n-1)_set=K*(Cn1/Cn)*(Tmid(n-2)_set+Tleave_set)/2.

For step S230, the refrigeration capacity of each cooler unit may be adjusted by adjusting a compressor inlet guide vane to enable the middle water temperatures Tmid1, Tmid2 . . . Tmid(n-1) to be close or equal to the middle water temperature set values Tmid1_set, Tmid2_set . . . Tmid(n-1)_set and/or to enable the leaving water temperature Tleave to be close or equal to the leaving water temperature set value Tleave_set. For example, when the middle water temperatures Tmid1, Tmid2 . . . Tmid(n-1) are smaller than the middle water temperature set values Tmid1_set, Tmid2_set . . . Tmid(n-1)_set, the refrigeration capacity of each upstream cooler unit is decreased by decreasing the opening of the compressor inlet guide vane of each upstream cooler unit to enable the middle water temperatures Tmid1, Tmid2 . . . Tmid(n-1) to rise to be equal to the middle water temperature set values Tmid1_set, Tmid2_set . . . Tmid(n-1)_set; and/or when the middle water temperatures Tmid1, Tmid2 . . . Tmid(n-1) are greater than the middle water temperature set values Tmid1_set, Tmid2_set . . . Tmid(n-1)_set, the refrigeration capacity of each upstream cooler unit is increased by increasing the opening of the compressor inlet guide vane of each upstream cooler unit to enable the middle water temperatures Tmid1, Tmid2 . . . Tmid(n-1) to drop to be equal to the middle water temperature set values Tmid1_set, Tmid2_set . . . Tmid(n-1)_set. For another example, when the leaving water temperature Tleave is smaller than the leaving water temperature set value Tleave_set, the refrigeration capacity of the downstream cooler unit is decreased by decreasing the opening of the compressor inlet guide vane of the downstream cooler unit to enable the leaving water temperature Tleave to rise to be equal to the leaving water temperature set value Tleave_set; and/or when the leaving water temperature Tleave is greater than the leaving water temperature set value Tleave_set, the refrigeration capacity of the downstream cooler unit is increased by increasing the opening of the compressor inlet guide vane of the downstream cooler unit to enable the leaving water temperature Tleave to drop to be equal to the leaving water temperature set value Tleave_set.

For step S230, the refrigeration capacity of each upstream cooler unit and/or the downstream cooler unit may also be adjusted by controlling a frequency converter and/or a hot gas bypass branch to enable the middle water temperatures Tmid1, Tmid2 . . . Tmid(n-1) to be close or equal to the middle water temperature set values Tmid1_set, Tmid2_set . . . Tmid(n-1)_set and/or to enable the leaving water temperature Tleave to be close or equal to the leaving water temperature set value Tleave_set. For example, when the middle water temperatures Tmid1, Tmid2 . . . Tmid(n-1) are smaller than the middle water temperature set values Tmid1_set, Tmid2_set . . . Tmid(n-1)_set, the refrigeration capacity of each upstream cooler unit is decreased by decreasing the compressor operating frequency of each upstream cooler unit and/or conducting the hot gas bypass branch to enable the middle water temperatures Tmid1, Tmid2 . . . Tmid(n-1) to rise to be equal to the middle water temperature set values Tmid1_set, Tmid2_set . . . Tmid(n-1)_set; and/or when the middle water temperatures Tmid1, Tmid2 . . . Tmid(n-1) are greater than the middle water temperature set values Tmid1_set, Tmid2_set . . . Tmid(n-1)_set, the refrigeration capacity of each upstream cooler unit is increased by increasing the compressor operating frequency of each upstream cooler unit and/or disconnecting the hot gas bypass branch to enable the middle water temperatures Tmid1, Tmid2 . . . Tmid(n-1) to drop to be equal to the middle water temperature set values Tmid1_set, Tmid2_set . . . Tmid(n-1)_set. For another example, when the leaving water temperature Tleave is smaller than the leaving water temperature set value Tleave_set, the refrigeration capacity of the downstream cooler unit is decreased by decreasing the compressor operating frequency of the downstream cooler unit and/or conducting the hot gas bypass branch to enable the leaving water temperature Tleave to rise to be equal to the leaving water temperature set value Tleave_set; and/or when the leaving water temperature Tleave is greater than the leaving water temperature set value Tleave_set, the refrigeration capacity of the downstream cooler unit is increased by increasing the compressor operating frequency of the downstream cooler unit and/or disconnecting the hot gas bypass branch to enable the leaving water temperature Tleave to drop to be equal to the leaving water temperature set value Tleave_set.

Besides, since adjustment ranges, adjustment accuracy and response time lengths which can be provided by the above-mentioned several adjustment methods have differences, the effect is better if the above-mentioned control methods are combined for use according to the requirements.

In the description of the present invention, it needs to be understood that direction or position relationships indicated by terms "above", "below", "front", "rear", "left", "right" and the like are based on direction or position relationships illustrated in the drawings, are only used for facilitating the description of the present invention and simplifying the description instead of indicating or implying that the indicated devices or features must have specific directions and be constructed and operated in specific directions, and thus shall not be understood as limitations to the present invention.

The above-mentioned examples mainly describe the cooler system, the middle water temperature acquisition method for the cooler system and the control method for the cooler system provided by the present invention. Although only some implementation modes of the present invention are described, one skilled in the art shall understand that the present invention may be implemented by many other means without departing from the essence and scope of the present invention. Therefore, the described examples and implementation modes shall be considered as exemplary instead of restrictive. The present invention may cover various modifications and replacements without going beyond the spirit and scope of the present invention as defined by the attached claims.

The invention claimed is:

1. A cooler system comprising:
    a plurality of cooler units;
    a condensed water flow path, an aqueous medium in the condensed water flow path sequentially flowing through each of the cooler units;
    a cooling water flow path, an aqueous medium in the cooling water flow path sequentially flowing through each of the cooler units in a flow direction opposite to a flow direction of the aqueous medium in the condensed water flow path; and
    a plurality of current sensors used for detecting working currents of the cooler units;
    water temperature sensors used for detecting an entering water temperature Tenter and a leaving water temperature Tleave of the cooling water flow path;
    at least one virtual temperature sensor arranged between the cooler units and used for acquiring a middle water temperature on the cooling water flow path between the cooler units; and
    a controller configured to set a middle water temperature set value and/or a leaving water temperature set value and configured to adjust a refrigeration capacity of the cooler units to enable the middle water temperature to be equal to the middle water temperature set value and/or to enable the leaving water temperature to equal to the leaving water temperature set value;
    wherein the controller is configured to:
        S110, acquiring the entering water temperature Tenter and the leaving water temperature Tleave of a cooling water flow path of the cooler system;
        S120, acquiring working currents I1, I2 . . . In of the cooler units in the cooler system;
        S130, acquiring rated refrigeration capacities C1, C2 . . . Cn of the cooler units in the cooler system; and
        S140, acquiring middle water temperatures Tmid1, Tmid2 . . . Tmid(n-1) based on a ratio relation among a ratio of temperature differences between the entering water temperature and the leaving water temperature of each of the cooler units, a ratio of rated refrigeration capacities of the cooler units, a ratio of working currents of the cooler units and a correction factor, where n is the number of cooler units and n is greater than or equal to 2.

2. The cooler system according to claim 1, wherein when the number of the cooler units in the cooler system is two, step S140 comprises:
    acquiring a middle water temperature Tmid1 based on a ratio relation among a ratio Tenter−Tmid1/Tmid1−Tleave of temperature differences between the entering water temperature and the leaving water temperature of each of the two cooler units, a ratio C1/C2 of rated refrigeration capacities of the two cooler units, a ratio I1/I2 of working currents of the two cooler units and a correction factor R.

3. The cooler system according to claim 2, wherein when rated refrigeration capacities of two cooler units are equal, C1/C2=1; or when a rated refrigeration capacity C1 of an upstream cooler unit is greater than a rated refrigeration capacity C2 of a downstream cooler unit, C1/C2>1; or when a rated refrigeration capacity C1 of an upstream cooler unit is smaller than a rated refrigeration capacity C2 of a downstream cooler unit, C1/C2<1.

4. The cooler system according to claim 2, wherein, in step S140, the ratio relation is (Tenter−Tmid1)/(Tmid1−Tleave)=R*(C1/C2)*(I1/I2).

5. The cooler system according to claim 1, wherein when the number of cooler units in the cooler system is three, step S140 comprises:
    acquiring a first middle water temperature Tmid1 and a second middle water temperature Tmid2 based on a ratio relation among ratios (Tenter−Tmid1/Tmid1−Tmid2) and (Tmid1−Tmid2/Tmid2−Tleave) of temperature differences between an entering water temperature and a leaving water temperature of each of the three cooler units, ratios C1/C2 and C2/C3 of rated refrigeration capacities of the three cooler units, ratios I1/I2 and I2/I3 of working currents of the three cooler units and a correction factor R.

6. The cooler system according to claim 5, wherein when rated refrigeration capacities of three cooler units are equal, C1/C2=C2/C3=1; or when a rated refrigeration capacity C1 of a first upstream cooler unit is greater than a rated refrigeration capacity C2 of a second upstream cooler unit, C1/C2>1; or when a rated refrigeration capacity C1 of a first upstream cooler unit is smaller than a rated refrigeration capacity C2 of a second upstream cooler unit, C1/C2<1; and/or when a rated refrigeration capacity C2 of a second upstream cooler unit is greater than a rated refrigeration capacity C3 of a downstream cooler unit, C2/C3>1; or when a rated refrigeration capacity C2 of a second upstream cooler unit is smaller than a rated refrigeration capacity C3 of a downstream cooler unit, C2/C3<1.

7. The cooler system according to claim 5, wherein step S140 further comprises:
    acquiring a first middle water temperature Tmid1 and a second middle water temperature Tmid2 based on ratio relations (Tenter−Tmid1)/(Tmid1−Tmid2)=R*(C1/C2)*(I1/I2) and (Tmid1−Tmid2)/(Tmid2−Tleave)=R*(C2/C3)*(I2/I3).

* * * * *